Patented Jan. 21, 1930

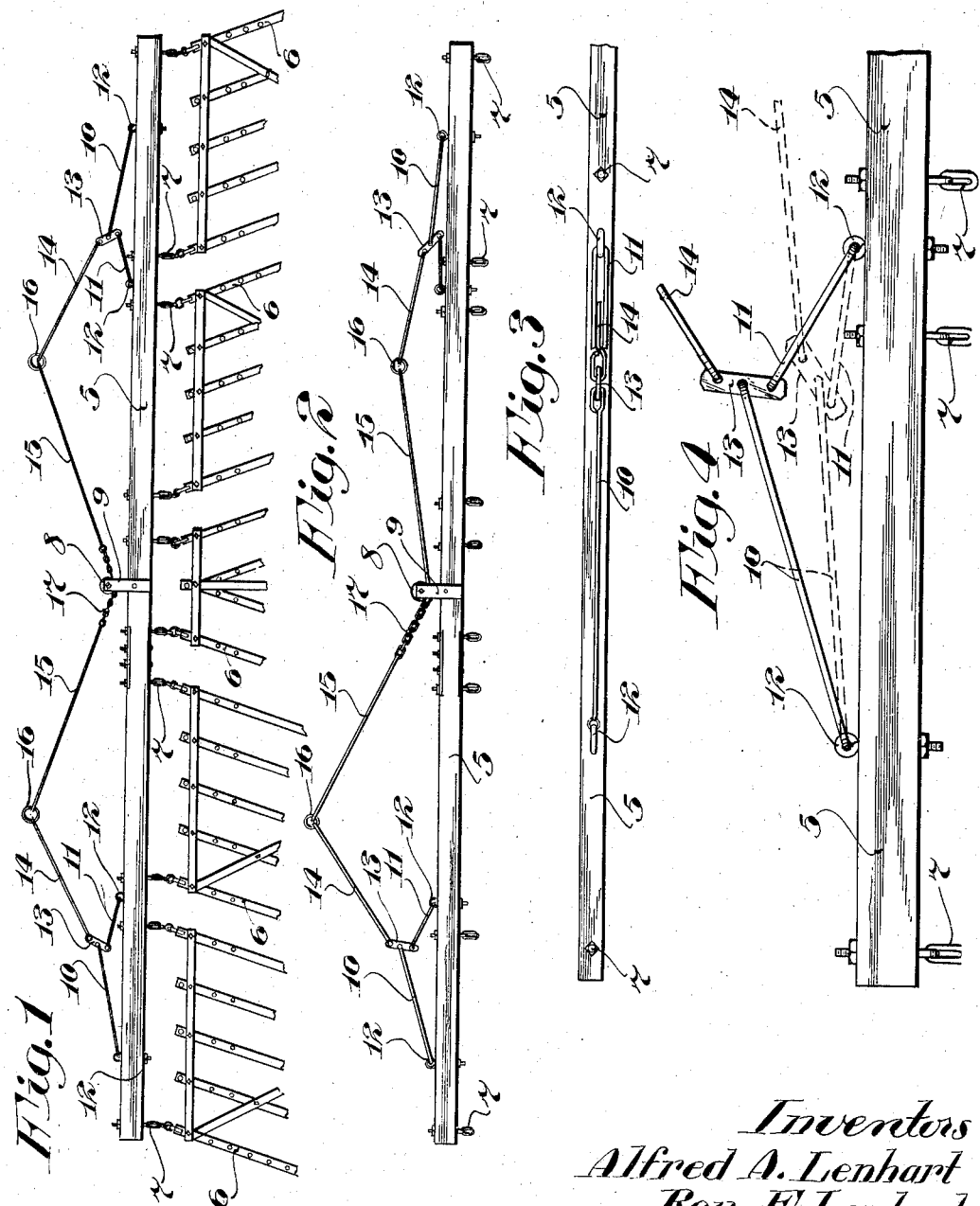

1,744,126

UNITED STATES PATENT OFFICE

ALFRED A. LENHART AND ROY F. LENHART, OF MINNEAPOLIS, MINNESOTA

SLACK-COMPENSATING HITCH FOR HARROWS

Application filed November 26, 1928. Serial No. 321,980.

Our present invention has for its object to provide a simple and highly efficient slack compensating hitch for a multiple section harrow, and to such ends, the invention consists of the novel devices and combinations of devices hereinafter described and defined in the claim.

In the present use of a long drag beam for connecting a plurality of laterally spaced harrow sections, great difficulty is encountered in preventing the tangling up of the eveners, equalizers, drag beam and harrow sections when the draft strain is unequally applied to the draft beam usually caused by one team lagging behind the other.

By the use of our invention, slack in the draft connections is automatically taken up as the draft strain is unequally applied to the drag beam thus preventing said connections from tangling up and keeping the beam parallel to the front ends of the harrow sections with a result that said sections are always kept in a definite laterally spaced relation with each other and no undue strain placed on the draft beam that would tend to bend the same.

In the accompanying drawings, which illustrate the invention, like characters indicate like parts throughout the several views.

Referring to the drawings:

Fig. 1 is a plan view of a drag beam having the invention embodied therein and also illustrating fragments of harrow sections attached to said beam;

Fig. 2 is is a view corresponding to Fig. 1 with the exception that the draft connections are shown in different positions and the harrow sections are removed;

Fig. 3 is an enlarged fragmentary face view of the left hand end section of the drag beam and attached draft connections; and Fig. 4 is a plan view of the parts shown in Fig. 3 with some parts shown in different positions by means of broken lines.

The numeral 5 indicates a long drag beam having a plurality of harrow sections 6, as shown five, loosely connected to the rear longitudinal edge thereof by eye-bolts and short links 7. A guide sheave 8 is attached to the longitudinal center of the drag beam 5 by a pair of upper and lower metal straps 9 between and to which said sheave is journaled. The drag beam 5 extends between the straps 9 which project forward therefrom and are rigidly secured thereto by rivets, bolts or the like.

A pair of forwardly projecting converging links 10 and 11, the former of which is relatively long and the latter relatively short, have their inner ends loosely attached at 12 to the front edge of the drag beam 5 at each end thereof. Said links 10 are attached to the drag beam 5 near the ends thereof and the links 11 are attached to said beam between the attachment of the links 10 and the guide sheave 8. The links 10 and 11 of each pair are loosely connected at their outer ends by a short forwardly projecting slack compensating lever 13. The slack compensating levers 13 are in converging relation and the links 11 are attached to the rear ends thereof while the links 10 are attached to the longitudinal centers of said levers.

A pair of forwardly projecting converging links 14 have their rear ends loosely attached to the front ends of the levers 13 and an equalizing draft connection including a pair of forwardly projecting diverging links 15 having their front ends attached by rings 16 to the front ends of the links 14. The inner ends of the links 15 are flexibly connected by a short chain 17 which runs over the guide sheave 8. Either a two or three horse evener, not shown, will be attached to each ring 16.

The links 10, 14 and 15 are, as shown, preferably formed from stiff rods having at their ends coupling eyes and the links 11 are in the form of elongated loops into which the levers 13 may move, as best shown by broken lines in Fig. 4 and by full lines in Fig. 2. All of the links 10, 11, 14 and 15 act as tension members at all times and it will be noted that the draft strain is distributed longitudinally of the drag beam 5 at five different points. The connections 8 and 12 are so arranged longitudinally of the drag beam 5 in a manner that will have the least tendency to bend said beam. From the rings 16 to which the eveners, not shown, are attached the pulling strain will be distributed through the links 10, 11, 14 and 15 to the drag beam 5. This pulling strain acting on the levers 13 keeps the links 10, 11, 14 and 15 under tension and automatically takes up slack therein and always keeps the same in definite and predetermined relation to each other. These levers 13 and links 10, 11, 14 and 15 perform the same function irrespective of the draft strain applied to the rings 16 as will be noted in Fig. 1 where the draft strain is equally applied to the rings 16 and in Fig. 2 where the draft strain is unequally applied caused by one team lagging behind the other.

By keeping the links 10, 11, 14 and 15 under tension at all times irrespective of the draft strain on the rings 16, all danger of tangling is eliminated and the drag beam 5 is always kept parallel to the front ends of the harrow sections 6. With the drag beam 5 constantly kept parallel to the front of the harrow sections 6 said harrow sections in turn are kept in a definite relation to each other and prevents the same from crowding or piling up, the one on the other.

What we claim is:

The combination with a drag beam, of a pair of forwardly projecting slack compensating levers, an outer link and an inner link attached to each end portion of the drag beam in opposed relation and connecting the former to the intermediate portion of one of said levers and the latter to the inner end thereof, and an equalizing draft connection operatively connected to the central portion of the drag beam and connecting the slack compensating levers at their outer ends and operative on said levers to pull the links of each pair toward each other.

In testimony whereof we affix our signatures.

ALFRED A. LENHART.
ROY F. LENHART.